United States Patent [19]
Benkmann

[11] Patent Number: 4,732,578
[45] Date of Patent: Mar. 22, 1988

[54] PRESSURE SWING ADSORPTION PROCESS

[75] Inventor: Christian Benkmann, Graefelfing, Fed. Rep. of Germany

[73] Assignee: Linde Aktiengesellschaft, Wiesbaden, Fed. Rep. of Germany

[21] Appl. No.: 939,911

[22] Filed: Dec. 9, 1986

[30] Foreign Application Priority Data

Dec. 9, 1985 [DE] Fed. Rep. of Germany ....... 3543468

[51] Int. Cl.$^4$ ........................................... B01D 53/04
[52] U.S. Cl. ........................................ 55/21; 55/26; 55/62; 55/68; 55/74; 55/163; 55/179; 55/387
[58] Field of Search ................. 55/21, 25, 26, 31, 33, 55/35, 58, 59, 62, 68, 74, 75, 160–163, 179, 387, 389

[56] References Cited

U.S. PATENT DOCUMENTS

| | | | |
|---|---|---|---|
| 2,918,140 | 12/1959 | Brooks | 55/62 X |
| 3,102,013 | 8/1963 | Skarstrom | 55/62 X |
| 3,149,934 | 9/1964 | Martin | 55/62 X |
| 3,150,942 | 9/1964 | Vasan | 55/33 X |
| 3,237,379 | 3/1966 | Kant et al. | 55/62 X |
| 3,377,812 | 4/1968 | Garrett et al. | 55/62 X |
| 3,702,525 | 11/1972 | Simonet et al. | 55/62 X |
| 3,923,477 | 12/1975 | Armond et al. | 55/25 |
| 3,986,849 | 10/1976 | Fuderer et al. | 55/25 |
| 4,013,429 | 3/1977 | Sircar et al. | 55/33 |
| 4,168,149 | 9/1979 | Armond et al. | 55/21 |
| 4,171,207 | 10/1979 | Sircar | 55/26 |
| 4,299,596 | 11/1981 | Benkmann | 55/26 |
| 4,375,363 | 3/1983 | Fuderer | 55/25 |
| 4,376,639 | 3/1983 | Vo | 55/26 |
| 4,376,640 | 3/1983 | Vo | 55/26 |
| 4,381,189 | 4/1983 | Fuderer | 55/26 |
| 4,475,929 | 10/1984 | Fuderer | 55/25 |
| 4,640,694 | 2/1987 | Leitgeb et al. | 55/26 |

FOREIGN PATENT DOCUMENTS

0066869 12/1982 European Pat. Off. .

OTHER PUBLICATIONS

European Search Report.

*Primary Examiner*—Robert Spitzer
*Attorney, Agent, or Firm*—Millen & White

[57] ABSTRACT

A pressure swing adsorption process for the selective adsorption of at least one gaseous component from a gaseous mixture and an apparatus for performing the process wherein the gaseous mixture is conducted in cyclic alternation through at least three adsorbers and each adsorber is subdivided into two serially connected adsorber sections. The feed gas mixture is passed, during an adsorption phase, through respectively two series-connected adsorber sections. After termination of at least one cocurrent expansion phase, the adsorber sections are isolated from each other, and the first adsorber section, i.e., first traversed by the feed gas mixture, is further expanded while the second adsorber section is maintained at a higher pressure. Thereafter, the second adsorber section can be expanded countercurrently and thus-withdrawn countercurrent expansion gas can be utilized for purging the first adsorber section.

28 Claims, 6 Drawing Figures

PRESSURE SWING ADSORPTION PROCESS

BACKGROUND OF THE INVENTION

This invention relates to a pressure swing adsorption process for the selective adsorption of at least one gaseous component from a feed gas mixture, wherein the gaseous mixture is conducted in cyclic alternation through at least three adsorbers which then pass, in staggered fashion with respect to one another, through switching cycles. During an adsorption phase, a feed gas mixture is introduced under elevated pressure into an adsorber and unadsorbed gas is withdrawn from the adsorber. Partial expansion or depressurization of the adsorber in cocurrent mode (i.e., in the same direction as adsorption was performed) occurs after termination of the adsorption phase, and the thus-obtained cocurrent expansion gas is passed on at least in part to other adsorbers to partially repressurize the other adsorbers. After termination of the cocurrent expansion, a countercurrent expansion and, at the lowest process pressure, an optional purge with a purging gas are performed. Finally, the switching cycle is completed by subsequently repressurizing the adsorber to the adsorption pressure.

In conventional pressure swing adsorption processes (also know as PSA processes), multistage cocurrent expansion, i.e., depressurization, takes place normally subsequent to an adsorption phase. The thus-obtained cocurrent expansion gas is conducted into one or several regenerated adsorbers so as to repressurize the regenerated adsorbers. In other words, the cocurrent expansion gas is used to build up pressure within a regenerated adsorber through pressure equalization with the adsorber undergoing a cocurrent expansion phase. Following one or several such pressure equalizations, gas from a further cocurrent expansion phase is utilized in order to purge a further adsorber at the lowest process pressure. The reasonable final pressure level to which a loaded adsorber is brought by cocurrent expansion depends on the concentration of adsorbed components, the adsorption pressure, and the magnitude of adsorbent reserves provided for the advancement of the adsorption front during cocurrent expansion in the adsorber.

In order to attain high product yields, a PSA process known from U.S. Pat. No. 3,986,849 pursues the objective of performing cocurrent expansion to a maximum low pressure level in order to regain much of the product component contained in a gas space of the adsorber. A consequence of this process is that substantially larger adsorbers are needed than are required for the actual adsorption phase. In order to avoid this drawback, a PSA process known from U.S. Pat. No. 4,381,189 terminates the cocurrent expansion at a higher pressure and provides that a portion of the gas obtained during the subsequent countercurrent expansion is additionally purified in auxiliary adsorbers and then reintroduced into the main adsorbers as the purge gas. This means that impurities that had been adsorbed in the main adsorber must be adsorbed a second time in the auxiliary adsorber and thus still involves a high demand for adsorbent.

SUMMARY OF THE INVENTION

An object of this invention is to provide a pressure swing adsorption (PSA) process which enhances the utilization of the adsorbent.

Another object of this invention is to provide a PSA process which is universally applicable for selective adsorption of components from a gas mixture while at the same time being particularly suitable for situations involving high adsorption pressures and a high concentration of adsorbable components.

Another object of this invention is to provide a PSA process which provides for extensive regeneration of an adsorber without requiring purge gas from an additional adsorber undergoing cocurrent expansion or purge gas in the form of product gas.

Another object is to provide an apparatus suitable for producing the process of the invention.

A further object is to provide a compact installation for conducting a PSA process.

Upon further study of the specification and appended claims, further objects and advantages of this invention will become apparent to those skilled in the art.

These objects are attained in the process of the invention by providing that the feed gas mixture is conducted, during an adsorption phase, through an adsorber having two series-connected adsorber sections. After termination of at least one cocurrent expansion phase, the two adsorber sections are isolated from each other and the first adsorber section, i.e., the first traversed by the feed gas mixture, is subjected to further cocurrent expansion while the second adsorber section is maintained at a higher pressure. Thereafter, the second adsorber section is expanded countercurrently and countercurrent expansion gas removed during this step is utilized for purging the first adsorber section.

The essential feature of the process of this invention resides in the subdivision of a heretofore customary, single adsorber into two series-connected adsorber sections. While the two adsorber sections, during an adsorption phase and a subsequent cocurrent expansion phase, remain connected in series and act exactly like a single, correspondingly larger adsorber, considerable advantages are achieved during the subsequent regeneration on account of the subdivision. The first adsorber section, which in the case of adsorption of only one component is loaded more extensively than the second adsorber section and in the case of adsorption of different components is loaded with the more strongly adsorbable component, is first subjected to desorption of the adsorbed components during cocurrent expansion and then subsequently subjected to a more extensive desorption during purging with the purge gas made available by the second adsorber section. The term "component" as used in the above description of the two cases and hereinafter refers to a single component or to groups of various gaseous components.

On account of these process steps, an extensive regeneration of the adsorber sections is made possible at this early point in time during the switching cycle without requiring the use of either expansion gas from another adsorber undergoing a cocurrent expansion phase or product gas as a purge gas. As a consequence, less unadsorbable components are passed through the adsorber as purge gas, thus leading directly to a corresponding improvement in the yield of the unadsorbed component. Insofar as an improvement in yield of the unadsorbed component may not be an objective, the adsorption process in any event can be performed in a more compact PSA installation. Of course, if a more extensive regeneration of the adsorber is desired, the adsorber sections can be subjected to a purge step using, for example, either product gas or expansion gas as the purge gas.

The further expansion of the first adsorber section after its isolation from the second adsorber section takes place advantageously at least in part countercurrently to the flow direction during an adsorption phase. Depending on the loaded condition of the first adsorber section after termination of joint cocurrent expansion, a cocurrent expansion of the first adsorber section may in some cases initially still be possible and the gas thus-obtained can be fed to another adsorber passing through a pressure buildup phase at a suitable pressure level. However, in case of an extensively complete loading of the first adsorber section it will generally be more advantageous to immediately effect a countercurrent expansion phase down to the lowest process pressure. Even with a previously carried out cocurrent expansion phase, it is normally suitable to effect the subsequent lowering to the lowest process pressure in countercurrent mode.

The second adsorber section can perform any desired process step or steps during the further expansion of the first adsorber section, insofar as the pressure in the second adsorber section during such steps remains substantially unchanged. In a preferred embodiment of the invention, during further expansion of the first adsorber section the pressure within the second adsorber section is simply maintained at the final pressure of the joint cocurrent expansion.

To prevent the occurence of a disadvantageous pressure surge at the beginning of the purging of the first adsorber section due to the initially large pressure gradient between the further expanded first adsorber section and the second adsorber section to be expanded in countercurrent mode, and to avoid the efflux of a strongly nonuniform residual gas quantity from the first adsorber section, an advantageous further development of the invention provides that the countercurrent expansion gas from the second adsorber section is gradually expanded by means of a regulating valve into the first adsorber section, whereby the countercurrent expansion gas is conducted as a purge gas through the first adsorber section. The position of the regulating valve can advantageously be monitored by a program control unit which continuously measures the pressure of the second adsorber section during its countercurrent expansion phase and compares this pressure with a predetemined desired pressure. By way of the program control unit, the opening of the regulating valve can be adjusted accordingly.

The process of this invention is suitable for the separation of a gaseous mixture within a wide pressure range and is especially suited specifically for feed gas mixtures present at a relatively high pressure. While conventional adsorption processes as described, for example, in U.S. Pat. No. 3,986,849 generally are not employed at adsorption pressures above about 30 bar, the PSA process of this invention can be used for adsorption at a pressure of about 10-100 bar, preferably about 20-100 bar, and especially at pressures above about 30 bar, for example about 30-90 bar. The process of this invention is particularly advantageous, moreover, if the starting mixture contains a relatively high proportion of adsorbable components, for example at least 30 mol % adsorbable components. In this connection, the product gas can be either a fraction substantially free of adsorbable components or a gaseous stream merely depleted of adsorbable components.

The joint cocurrent expansion of the first and second adsorber sections can suitably be conducted to such an extent that the pressure within the adsorber is decreased to the partial pressure of the adsorbable component or to an even lower pressure. If obtainment of an unadsorbable component in a merely enriched form is desired, then it is advantageous to effect joint cocurrent expansion to a pressure corresponding to about 0.5 to 1.0 times, preferably 0.7-0.8 times, the partial pressure of the adsorbable component. If cocurrent expansion is continued further, there is the danger that proportions which are again desorbed are withdrawn in too large a volume from the outlet end of the adsorber together with the cocurrent expansion gas whereby the desired product purity in a subsequent adsorption phase is not ensured. In contrast, with a higher final pressure of the cocurrent expansion, considerable amounts of unadsorbable component are still retained in the void volume of the adsorber and are then lost during a subsequent countercurrent expansion, leading consequently to a reduction in yield.

In an advantageous further development of the process according to this invention, the second adsorber section is regenerated solely by expansion without passing through a purging phase. This mode of operation is beneficial if the partial pressure of the component adsorbed in the second adsorber section is at least about twice as high as the lowest expansion pressure. Under these prerequisites, the pressure differences existing between the partial pressure of the adsorbed component and the expansion pressure are so high that adequate desorption is ensured in many cases. This manner of operating the process is suitable particularly in case the unadsorbed component is to be obtained in an enriched form, but not in the pure form.

An especially advantageous instance of utilizing the PSA process of this invention presents itself in the case where the feed gas mixture contains at least three components of different degrees of adsorbability, and the adsorber sections are subdivided so that, at the end of an adsorption phase, essentially only the most strongly adsorbable component is adsorbed in the first adsorber section, and essentially only the component of intermediate adsorbance is adsorbed in the second adsorber section, while the least adsorbable component and/or the unadsorbable component is withdrawn from the second adsorber section in a pure or enriched form. Use of the process of this invention in such a gas separation is of special advantage inasmuch as the countercurrent expansion gas of the second adsorber section, which purges the first adsorber section, is then essentially free of components adsorbed in the first adsorber section. This countercurrent expansion gas is thus especially suited as purge gas for the first adsorber section.

In the separation of such a three- or multi-component feed gas mixture, a condition prevails at the end of an adsorption phase for the first adsorber section corresponding essentially to the conventional loaded condition of a single adsorber upon separation of one component. After termination of the joint cocurrent expansion of both adsorber sections, it will, therefore, also be advantageous in many cases to effect the separate further expansion of the first adsorber section initially in cocurrent mode and to introduce the thus-obtained cocurrent expansion gas into another first adsorber section for repressurization by pressure equalization. This leads to a further increase in yield since the components unadsorbable in the first adsorber section are, in this case, not removed as residual gas together with the countercurrent expansion gas, but rather are in a practical fashion reused for pressure buildup of another first adsorber section.

Just as in the case of separating a feed gas mixture consisting essentially of two components, it is also suitable when separating three- or multicomponent feed gas mixtures to effect the joint cocurrent expansion of both adsorber sections to a pressure corresponding to about 0.5 to 1.0 times, preferably 0.7 to 0.8 times, the partial pressure of the adsorbable components. In this case, however, it must be kept in mind that the partial pressure selected is that of the adsorbable component present in a higher concentration in the feed gas mixture since this condition is to be maintained for both adsorber sections.

Prior to joint repressurization of the first and second adsorber sections, the first adsorber section may undergo a pressure buildup phase by pressure equilization with another first adsorber section. In such a case, a different pressure level prevails in the two adsorber sections before initiation of joint pressure buildup. If further pressure buildup is initiated by simply opening the connecting valve between the adsorber sections, undesirable pressure surges may occur. Therefore, in such a case, a provision is made whereby, through pressure equalization with another first and second adsorber section pair passing through a cocurrent expansion phase, the cocurrent expansion gas is initially fed only to the second adsorber section until the pressure of the latter corresponds essentially to the pressure of the first adsorber section attained by the latter after pressure equlization with another first adsorber section. Thereafter the two adsorber sections are connected with each other and further pressurized together. Such a mode of operation can be performed by measuring the pressure within each adsorber section, sending the pressure measurements to a program control unit which controls operation of the connecting valve between the two adsorbers and then opening the connecting valve at a point in time when the pressures in both adsorber sections are substantially the same or fall below a predetermined minimum difference. A program control unit required for this purpose, operating, for example, electrically or penumatically, is needed anyway for the operation of a PSA plant and can normally be enhanced in the aforementioned way without great expenditure.

In another embodiment of the invention, the pressure difference between a first and second adsorber section, produced by the cocurrent expansion of another first adsorber section in pressure equalization with the first adsorber section, can be avoided from the beginning by feeding a portion of this cocurrent expansion gas not only to the first adsorber section but also the associated second adsorber section for repressuriation. Whether or not the introduction of such a cocurrent expansion gas into the second adsorber section is advantageous will depend in an individual case on the type of gases to be separated and on the desired purity of the process products.

During the joint cocurrent expansion phase of the series-connected adsorber sections, it is also possible in a further development of the invention to subdivide cocurrent expansion, in that the cocurrent expansion gas is withdrawn from the outlet ends of the individual adsorber sections and introduced into the respectively associated adsorber sections to be pressurized. In this case, fluid communication between the two adsorber sections can be either maintained or interrupted.

The process of this invention has universal application in the field of PSA separation processes and can be utilized in a large number of gas separations. It is suitable, for example, for obtaining an ammonia synthesis gas from crude gases having an excessively high nitrogen content and in certain instances other components, such as, for example, carbon dioxide. Thus, it is possible, for example, to produce from a crude gas with 35% nitrogen, 15% carbon dioxide and 50% hydrogen, using the process of this invention, an ammonia synthesis gas with the stoichiometric ratio of 75% hydrogen and 25% nitrogen required for ammonia synthesis. In this process, carbon dioxide is adsorbed in the first adsorber section, and a portion of the nitrogen is adsorbed in the second adsorber section. During an adsorption phase, a hydrogen-rich stream is withdrawn from the second adsorber section, this stream containing a progressively larger quantity of nitrogen. The unadsorbed gas in such a case is stored in an intermediate tank whereby fluctuations in concentration are smoothed out and, on the average, an ammonia synthesis gas is obtained having the required composition.

In a similar way, a gaseous feed mixture containing essentially hydrogen and carbon monoxide and in some cases additional components can be treated by the process to produce a synthesis gas for various synthesis, for example, methanol synthesis or oxosynthesis.

The process can also be used for fractionation of coke-oven gas which contains, for example, about 55–60% hydrogen and, in a typical composition, further contains about 25% methane, about 5% nitrogen and 5% carbon monoxide as relatively poorly adsorbable components, and about 5% carbon dioxide and $C_{2+}$ hydrocarbons as relatively readily adsorbable components. In such a case, carbon dioxide and the $C_{2+}$ hydrocarbons would be adsorbed in the first adsorber section, and methane, nitrogen as well as carbon monoxide would be adsorbed in the second adsorber section. The purge gas for the first adsorber section in such a case of applying the process contains essentially the proportion of less adsorbable components held back in the second adsorber section, i.e., methane, nitrogen and carbon monoxide, and in addition also a portion of the hydrogen still exiting from the second adsorber section during the countercurrent expansion of the latter.

As a result of employment of the process according to this invention, cycle periods are shortened as compared with conventional PSA processes because there is no need to resort to another adsorber yielding cocurrent expansion gas for purging an adsorber, but rather, in contrast thereto, the expansion gas used for purging is provided by the second adsorber section proper. The consequence thereof, inter alia, is that when using the same number of adsorbers as the conventional process, there is the possibility of performing an additional pressure equalization phase as compared with the conventional process. This means, inter alia, that pressure equalization is possible even with a mere three-adsorber installation without having to interrupt the continuous operation of the plant.

An apparatus for performing the process of this invention comprises at least three adsorbers, each of these adsorbers being connected by means of valves to a feed gas supply conduit, a discharge conduit for unadsorbed gas, a residual gas conduit, and at least one pressure equalization conduit, and a program control unit for switching the valves, wherein each adsorber is subdivided into two series-connected adsorber sections and a regulating valve is arranged between the two adsorber sections. The position of the regulating valve is controlled by the program control unit in dependence on the signal generated from a pressure transmitter associated with each second adsorber section. By means of the associated pressure transmitter, the control valve can be adjusted so that the purge gas discharged from the second adsorber section and intended for the first adsorber section is delivered in the respectively desired fashion. In an advantageous further development of the apparatus, each adsorber section contains a pressure transmitter so that in a process in which pressure equalization between two distinct first adsorber sections occurs, it is also possible to measure the pressure difference between the first and second adsorber sections of an adsorber during a pressurizing phase and thus to regulate the opening of the connecting valve.

Although the invention has been described wherein each adsorber was subdivided into two separate adsorber sections, it is contemplated that the individual adsorbers can be even further subdivided to include three or more separate adsorber sections.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DISCUSSION OF THE PREFERRED EMBODIMENTS

Figure 1:
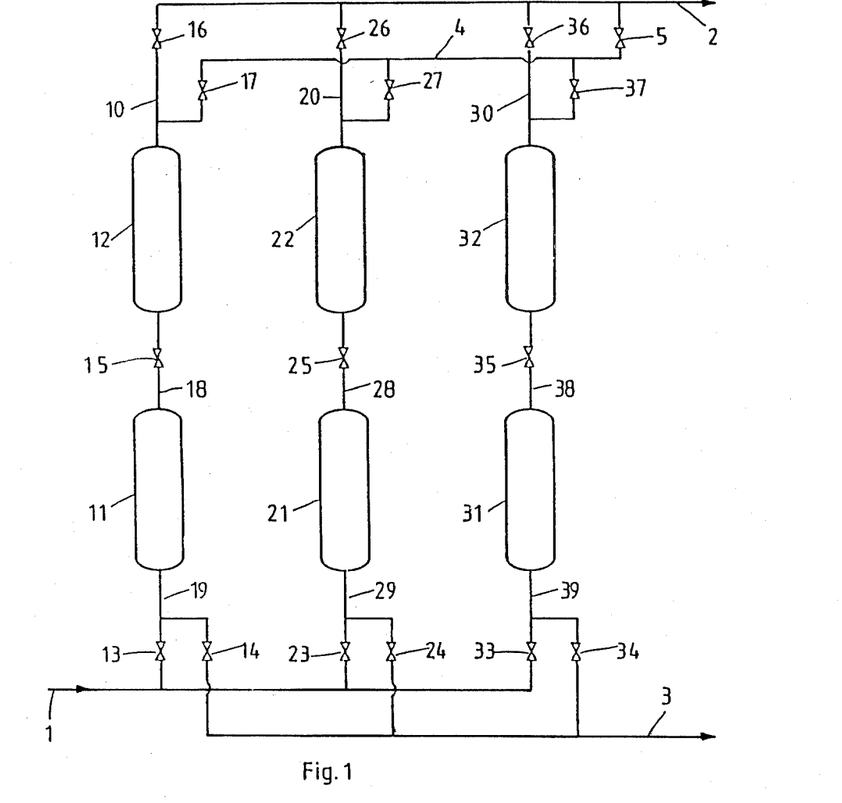
FIG. 1 shows a flowsheet of an installation suitable for carrying out the process of the invention having three adsorbers.

In the PSA installation shown in FIG. 1, three adsorbers are utilized. Each of the three adsorbers are subdivided into respectively a first adsorber section (11, 21, 31) and, respectively, a subsequently arranged second adsorber section (12, 22, 32). The outlet end of each first adsorber section is connected by means of a conduit 18, 28, and 38, equipped with a valve 15, 25, 35, to the inlet end of its respective second adsorber section. The inlet end of each first adsorber section 11, 21, 31 is respectively connected by way of conduits 19, 29, and 39, equipped with valves 13, 23, 33, to a feed gas mixture supply conduit 1. The outlet end of each second adsorber section 12, 22, 32 is connected via conduits 10, 20, 30, equipped with valves 16, 26, and 36, respectively, to a product gas discharge conduit 2. In addition, the inlet end of each first adsorber section is in communication, by way of a valve 14, 24, and 34, respectively, with a residual gas conduit 3. Also, the outlet end of each second adsorber section is in communication, by way of a valve 17, 27, and 37, respectively, with a conduit 4 utilized, on the one hand, for pressure equalization between two adsorbers and, on the other hand, for pressure buildup with product gas, for which purpose the conduit 4 is connected to the product gas conduit 2 via a valve 5.

Figure 2:
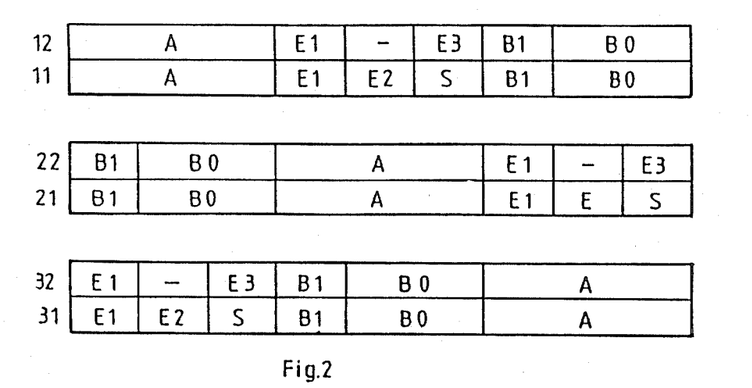
FIG. 2 shows a switching cycle scheme suitable for operation of the adsorption installation depicted in FIG. 1.

The operation of the PSA installation shown in FIG. 1 can be described in the simplest way with reference to the cycle scheme illustrated in FIG. 2. The adsorber consisting of adsorber sections 11 and 12 is supplied, during an adsorption phase A, with a feed gas mixture via conduit 1 and valve 13. The gas discharged from adsorber section 11 passes via conduit 18 and valve 15 into the second adsorber section 12. Purified and, respectively, enriched gas is discharged via conduit 10 from the second adsorber section 12 and passes via valve 16 into the product gas conduit 2. As can be seen from FIG. 3, the pressure in both adsorber sections 11 and 12 is the same and essentially constant over time during the adsorption phase A. Following an adsorption phase, a joint cocurrent expansion phase E1 of the two still serially connected adsorber sections 11 and 12 takes place. During this operating phase, the valves 13 and 16 are closed while valves 23 and 26 are opened, thus initiating an adsorption phase in adsorber sections 21, 22. With valve 15 being still open, the valve 17 is opened whereby cocurrent expansion gas is withdrawn via conduit 4 and introduced, via the valve 37 and conduit 30, into the second adsorber section 32 of the third pair of adsorber sections. This cocurrent expansion gas passes through valve 35 likewise into the first adsorber section 31 with valves 33 and 34 being closed so that pressurization also occurs therein. After termination of the pressure equalizing phase, the valves 15 and 17 are closed, and valve 14 at the inlet end of the first adsorber section 11 is opened. Thereby, the countercurrent expansion phase E2 of the first adsorber section 11 is initiated while the second adsorber section 12 remains at the pressure level attained at the end of the cocurrent expansion phase E1. During the countercurrent expansion phase E2, residual gas is withdrawn via conduit 3, and partial desorption of the loaded first adsorber section 11 is conducted. Upon reaching the lowest process pressure, the countecurrent expansion phase E2 is terminated, and valve 15 is gradually opened for the controlled depressurization of the second adsorber section 12 and associated purging of the first adsorber section 11. The opening of valve 15 is controlled by way of a pressure transmitter (not shown) associated with adsorber section 12. After termination of the countercurrent expansion phase E3 of the second adsorber section 12 and, respectively, of the associated purging phase S of the first adsorber section 11, both adsorber sections are essentially at the same, lowest process pressure and in general are adequately regenerated. If there should be an instance where this is not so, on account of a special task, an additional purging can optionally also be performed subsequently with a suitable purge gas flowing through both adsorber sections. For preparation of a new adsorption phase A, it is thus necessary to repressurize the adsorber sections 11 and 12. This takes place initially by pressure equalization with adsorber sections 21, 22 which, after termination of phases E3 and S, respectively, in adsorber sections 11, 12, have ended their adsorption phase A and, in turn, pass through a cocurrent expansion phase E1. During this phase, valves 17 and 27 are opened so that cocurrent expansion gas from adsorber sections 21, 22 flows via conduit 4 into the outlet end of adsorber section 12 and, via valve 15, also into the adsorber section 11. After termination of pressure equalization, a further pressure buildup phase B0 follows, during which valve 5 is opened and the adsorber sections 11 and 12 are supplied with product gas which flows via conduit 4 and valve 17 into the outlet end of adsorber section 12 and thereafter via valve 15 into adsorber section 11. After the adsorption pressure has been reached in adsorber sections 11 and 12, an operating cycle is concluded, and the feed gas mixture can once again be introduced into the adsorber pair by way of valve 13, which must in this case be opened. Instead of pressurizing with product gas during phase B0, it is also possible in many cases to employ crude gas for this phase, i.e., to introduce a part of the gaseous mixture supplied via conduit 1 into adsorbers 11, 12 by opening valve 13 while valve 16 remains closed.

Figure 4:
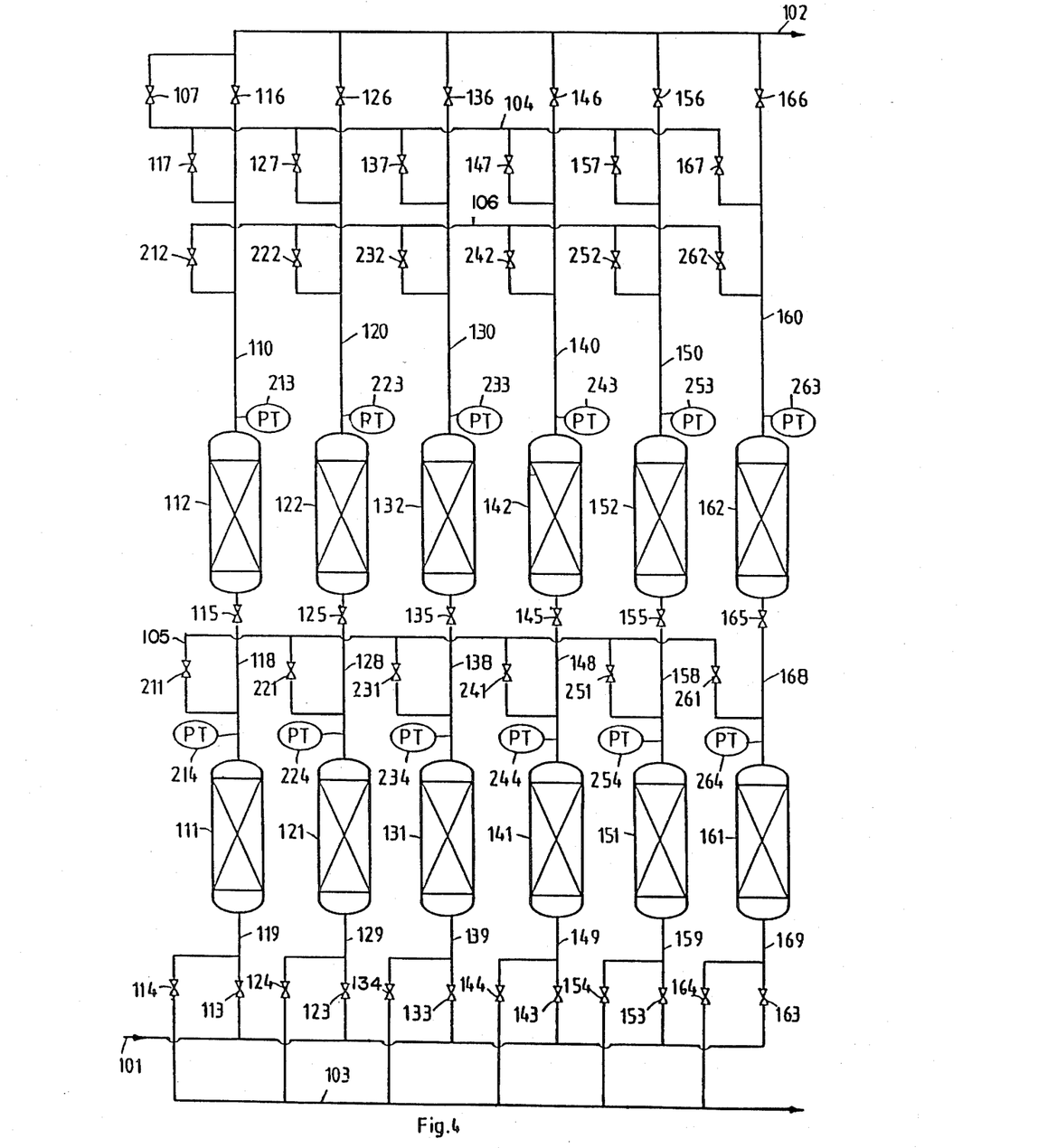
FIG. 4 shows a flowsheet of an installation suitable for practicing the process according to the invention having six adsorbers.

FIG. 4 illustrates a PSA plant with six adsorbers, constructed in principle like the installation with three adsorbers shown in FIG. 1. The conduits, valves, and adsorber sections thus have been provided with reference symbols analogously to those chosen for FIG. 1, merely adding a third numeral for purposes of differentiation. Accordingly, a feed gas mixture is supplied via conduit 101 and passes, for example, via valve 113, 123, 133, 143, 153 or 163 and conduit 119, 129, 139, 149, 159 or 169 into a first adsorber section 111, 121, 131, 141, 151 or 161 and then further, via conduit 118, 128, 138, 148, 158 or 168 and valve 115, 125, 135, 145, 155 or 165 into a second adsorber section 112, 122, 132, 142, 152 or 162 and is finally delivered as purified gas via conduit 110, 120, 130, 140, 150, or 160 and valve 116, 126, 136, 146, 156 or 166 to the product gas conduit 102. Furthermore, the inlet ends of the first adsorber sections are connected via conduits 119,129,139,149,159 and 169 and valves 114, 124, 134, 144, 154 and 164 to a residiual gas conduit 103. The outlet ends of the second adsorber sections are in communication with a pressure equalizing conduit 104 via conduits 110, 120, 130, 140, 150 and 160 and valve 117, 127, 137, 147, 157, and 167. The conduit 104, in turn, is also connected via valve 107, to the product gas conduit 102. All pairs of adsorber sections are likewise equipped with valves in a corresponding way.

Moreover, the PSA installation depicted in FIG. 4 contains furthermore a pressure equalizing conduit 105 connected by way of valves 211, 221, 231, 241, 251 and 261 to the outlet ends of the first adsorber sections and serving as a pressure equalizing conduit for pressure equalization between first adsorber sections with the valves 115, 125, 135, 145, 155 or 165 being closed. The conduit 105 can furthermore be employed for cocurrent pressure equalization during a joint pressure equalizing phase if pressure equalization is to be conducted not only via the outlet ends of the second adsorber sections but in parallel thereto also via the outlet ends of the first adsorber sections.

Further, the PSA installation shown in FIG. 4 has a conduit 106 connecting the outlet ends of the second adsorber sections and in communication with valves 212, 222, 232, 242, 252 and 262 and conduits 110, 120, 130, 140, 150 and 160, respectively. Conduit 106 can be utilized for further pressure equalization.

Figure 5:
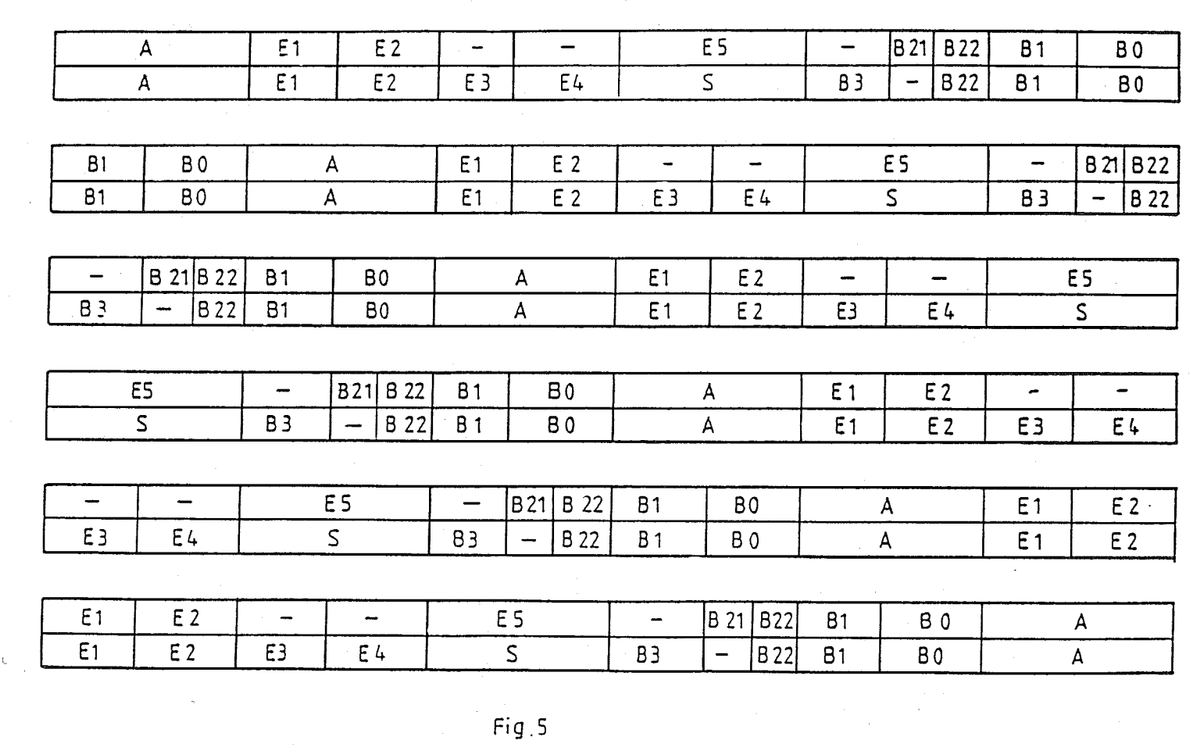
FIG. 5 shows a switching cycle scheme suitable for the operation of the adsorption installation shown in FIG. 4.

The mode of operation of the PSA installation illustrated in FIG. 4 can be described most simply with reference to the cycle scheme depicted in FIG. 5. The first adsorber, consisting of adsorber sections 111 and 112, passes through an adsorption phase A with valves 113, 115 and 116 being opened. During this phase, product gas and/or enriched gas is removed via conduit 102. After ending an adsorption phase, the valves 113 and 116 are closed and a cocurrent expansion phase E1 is initiated with an adsorber (e.g., 131, 132) to be pressurized, the latter than passing through a pressurization phase B1. For this purpose, with the valve 115 still being open, valve 117 is opened so that cocurrent expansion gas is discharged via conduit 104 and passed on via the opened valve 137 and conduit 130 to the outlet end of the second adsorber section 132 of the third pair of adsorber sections. The cocurrent expansion gas also enters, via the likewise opened valve 135, into the first adsorber section 131 of the third pair and also pressurizes the latter to an intermediate pressure. After termination of pressure equalization, a further cocurrent expansion phase E2 takes place with the fourth pair of adsorber sections 141, 142. Adsorber section 141, already having been pressurized to an intermediate pressure in pressure equalization with another first adsorber section, is initially excluded from pressure equalization, i.e., the valve 145 first remains closed. Cocurrent expansion gas from the first pair of adsorber sections passes via conduit 110, opened valve 212, conduit 106, opened valve 242 and conduit 140 to the outlet end of the second adsorber section 142 and brings the latter to the elevated intermediate pressure. Thus, section 142 experiences a pressurization phase B21. The pressure in adsorber sections 142 and 141 is measured by means of a pressure transmitter 243 and 244, respectively, and the pressure data are continuously transmitted to a program control unit. As soon as the signals transmitted by pressure transmitters 243 and 244 to the program control unit indicate substantially the same pressure in both adsorber sections, or as soon as a permissible minimum pressure difference between these two adsorber sections has been measured, the valve 145 is opened via the program control unit thus ending pressurization phase B21 in section 142, and pressure equlization now takes place with both adsorber sections 141 and 142 to be pressurized (i.e., pressurization phase B22).

After pressure equalization is finished, the cocurrent expansion phase E2 is concluded in sections 111 and 112 and the connecting valve 115 between the two adsorber sections is closed. While the adsorber section 112 remains at the pressure level reached after termination of cocurrent expansion, the first adsorber section 111 is further expanded cocurrently in expansion phase E3. During expansion phase E3, a pressure equalization occurs with the first adsorber section 151 of the fifth pair of adsorber sections, this section passing through a first pressure buildup B3 after termination of a purging phase S. For this purpose, cocurrent expansion gas is introduced via opened valve 211 and conduit 105 through the likewise opened valve 251 into the outlet end of the first adsorber section 151. After termination of this pressure equalizing phase, valve 211 is closed and further expansion of adsorber section 111 in expansion phase E4 takes place countercurrently to the flow direction during an adsorption phase by opening valve 114. The residual gas, enriched with desorbing components, thus is discharged by way of conduit 119 and is removed via conduit 103. After the first adsorber section 111 has reached its lowest process pressure at the end of the countercurrent expansion phase E4, it is purged with countercurrent expansion gas from the second adsorber section 112 during countercurrent expansion phase E5 and the associated purge phase S. For this purpose, valve 115 is gradually opened, the opening of the valve being regulated by the program control unit in dependence on the pressure in the second adsorber section 112 measured by the pressure transmitter 213. The residual gas, loaded with desorbed components, continues to enter the residual gas conduit 103 via conduit 119 and the opened valve 114.

After the end of the countercurrent expansion phase E5 of the second adsorber section 112 and of the associated purging phase S of the first adsorber section 111, taking place in parallel thereto, the valve 115 is closed again, and the first adsorber section 111 is pressurized in pressurization phase B3 to an intermediate pressure by pressure equalization with the first adsorber section 131 of the third pair of adsorber sections. This pressure equalization occurs via the opened valves 231 and 211, as well as by way of conduit 105. The valve 114 at the inlet end of the first adsorber section 111 is, of course, closed during this phase. After the initial pressure equalization has taken place during phase B3, another pressurization follows (phases B21 and B22) by pressure equalization with the fourth pair of adsorber sections while the latter are passing through their cocurrent expansion phase E2. On account of the different pressure levels in the adsorber sections 111 and 112, cocurrent expansion gas is first of all conducted via the opened valve 242 and conduit 106, as well as the opened valve 212 and conduit 110 to the outlet end of the second adsorber section 112 until the pressure in adsorber section 112 has reached the pressure of adsorber section 111 (connecting valve 115 being closed). Once the pressure in sections 111 and 112 is substantially the same (pressures monitored by the pressure transmitters 213 and 214), valve 115 is opened. The pressurization phase B21, during which only the second adsorber section 112 has been pressurized, is thus terminated, and the subsequent pressurization phase B22 provides pressure equalization between the respectively connected-together adsorber sections of the fourth and first pairs of adsorber sections. The pressures for adsorber sections 121, 131, 141, 151 and 161 will be monitored by the pressure transmitters (PT) 224, 234, 244, 254, and 264 and pressure transmitters (PT) 224, 234, 244, 254 and 264 and pressure transmitters 223, 233, 243, 253, and 263 do the same for adsorber sections 122, 132, 142, 152 and 162. After pressure equalization has taken place, a further pressure buildup phase B1 follows, which takes place through pressure equalization with an adsorber pair passing through a first cocurrent expansion phase E1. This, as can be seen from FIG. 5, is the fifth pair of adsorber sections so that cocurrent expansion gas is conducted via conduit 150 and valve 157, through conduit 104, valve 117 and conduit 110 to the outlet end of the second adsorber section 112, from where it flows, via the still opened valve 115, into the first adsorber section 111. After termination of this cocurrent expansion phase E1 of the fifth adsorber pair, valve 157 is closed and, with valve 117 remaining open, product gas is introduced from the product gas conduit 102 via the then opened valve 107 for further pressurization to adsorption pressure.

Figure 3:
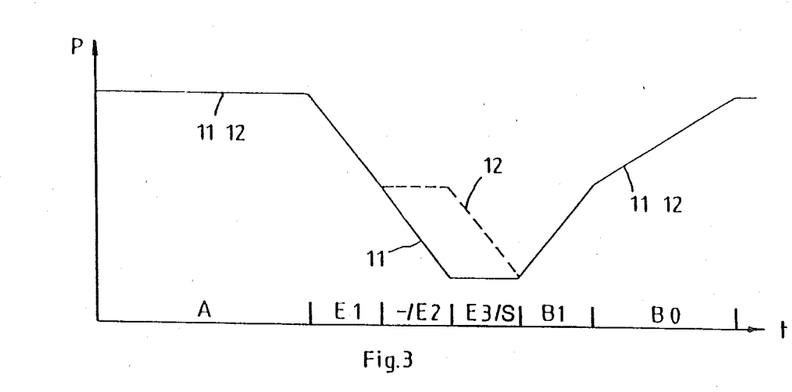
FIG. 3 shows the pressure curve of an adsorber from the installation according to FIG. 1 during a switching cycle when operated in accordance with the cycle scheme of FIG. 2.
Figure 6:
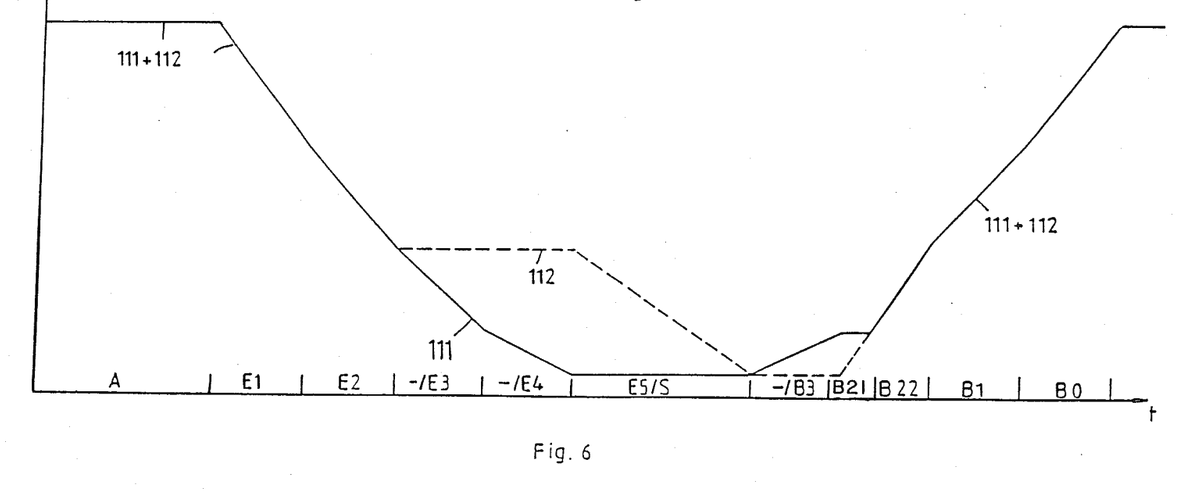
FIG. 6 shows the pressure curve of an adsorber from the installation according to FIG. 4 during a switching cycle with operation pursuant to the cycle scheme of FIG. 5.

FIG. 6 illustrates, in analogy to FIG. 3, the pressure curve within an adsorber pair during a switching cycle.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a pressure swing adsorption process for the selective adsorption of at least one gaseous component from a feed gas mixture comprising conducting the mixture in cyclic alternation through at least three adsorbers, each of said at least three adsorbers passing through a switching cycle in staggered fashion with respect to one another, said switching cycle including (a) an adsorption phase wherein said feed gas mixture is introduced at an elevated inlet pressure into an adsorber, said at least one gaseous component is adsorbed, and unadsorbed product gas is withdrawn from the adsorber; (b) a cocurrent expansion phase, after termination of said adsorption phase, during which the adsorber is regenerated by being depressurized to form an expansion gas which is passed on at least in part to other adsorbers for partial repressurization thereof; and (c) a pressurization phase during which the adsorber is subsequently repressurized to said inlet pressure, the improvement comprising each of said adsorbers being divided into a first adsorber section and a second adsorber section, said first and second adsorber sections being connected in series, and during said adsorption phase said feed gas mixture being respectively conducted through said first and second adsorber sections, said adsorber sections being isolated from each other after said cocurrent expansion phase and said first adsorber section being subjected to further depressurization while said second adsorber section is maintained at a higher pressure.

2. A process according to claim 1, wherein said second adsorber section prior to said pressurization phase and after said further depressurization of said first adsorber section is depressurized in a countercurrent expansion phase to form a countercurrent expansion gas which is used to purge said first adsorber section.

3. A process according to claim 2, wherein during said countercurrent expansion phase the countercurrent expansion gas from said second adsorber section is expanded, by means of a regulating valve, into said first adsorber section after said further depressurization of the latter whereby it is conducted as purge gas through said first adsorber section.

4. A process according to claim 3, wherein during said countercurrent expansion phase the pressure of said second adsorber section is continuously measured and compared with a predetermined desired value and said regulating valve is adjusted in accordance with the measured pressure of said second adsorber section.

5. A process according to claim 4, wherein said second adsorber section is provided with a pressure monitoring means and said pressure monitoring means sends signals to a program control unit which controls the operation of said regulating valve.

6. A process according to claim 1, wherein said first and second adsorber sections are jointly depressurized during said cocurrent expansion phase.

7. A process according to claim 6, wherein during said further depressurization of the said first adsorber section the pressure of said second adsorber is substantially maintained at the final pressure of the joint cocurrent expansion phase.

8. A process according to claim 6, wherein during the joint cocurrent expansion phase both adsorber sections are depressurized to a pressure corresponding to about 0.5 to 1.0 times the partial pressure of the adsorbed component.

9. A process according to claim 6, wherein during the joint cocurrent expansion phase both adsorber sections are depressurized to a pressure corresponding to about 0.7 to 0.8 times the partial pressure of the adsorbed component.

10. A process according to claim 6, wherein during the joint cocurrent expansion phase said first and second adsorber sections, cocurrent expansion gas is withdrawn from both the outlet end of said first adsorber section and the outlet end of said second adsorber section and introduced, respectively, into the first and second adsorber sections of another adsorber.

11. A process according to claim 1, wherein said further depressurization of said first adsorber section is performed at least in part by a countercurrent expansion.

12. A process according to claim 1, wherein said inlet pressure of said feed gas mixture is about 10-100 bar.

13. A process according to claim 1, wherein said inlet pressure of said feed gas mixture is about 20-100 bar.

14. A process according to claim 1, wherein said inlet pressure of said feed gas mixture is about 30-90 bar.

15. A process according to claim 1, wherein the partial pressure of the adsorbed component in said second adsorber section is at least about twice the lowest process pressure and wherein said second adsorber section is regenerated solely by depressurization.

16. A process according to claim 1, wherein the lowest pressure experienced by each adsorber section is substantially the same.

17. A process according to claim 1, wherein the feed gas mixture contains at least about 30 mol-% of adsorbable components.

18. A process according to claim 1, wherein the feed gas mixture contains at least three different components having different adsorbability and at the end of said adsorption phase, in the first adsorber section, essentially only the component having the highest adsorbability is adsorbed, in the second adsorber section, essentially only the component of intermediate adsorbance is adsorbed, and the gas withdrawn from the second adsorber section is enriched with the least adsorbable component.

19. A process according to claim 18, wherein said first adsorber section during said further depressurization is initially depressurized in cocurrent mode and the resultant cocurrent expansion gas is introduced into another first adsorber section for repressurization thereof.

20. A process according to claim 18, wherein said first and second adsorber sections are jointly depressurized during said cocurrent expansion phase.

21. A process according to claim 20, wherein during the joint cocurrent expansion phase, both adsorber sections are depressurized to a pressure corresponding to about 0.5 to 1.0 times the partial pressure of that component of said at least three components which is present in the feed gas mixture at the highest concentration.

22. A process according to claim 20, wherein during the joint cocurrent expansion phase, both adsorber sections are depressurized to a pressure corresponding to about 0.7 to 0.8 times the partial pressure of that component of said at least three components which is present in the feed gas mixture at the highest concentration.

23. A process according to claim 18, wherein the feed gas mixture consists essentially of hydrogen and nitrogen in a proportion of below 3:1 and, carbon dioxide and by adsorption of carbon dioxide and partial adsorption of nitrogen, a product gas is obtained essentially free of carbon dioxide and contains hydrogen and nitrogen in a proportion of about 3:1.

24. A process according to claim 1, wherein during said pressurization phase said first adsorber section is isolated from said second adsorber section and said first adsorber section is then pressurized to an intermediate pressure with cocurrent expansion gas from another first adsorber section.

25. A process according to claim 24, wherein after said first section is brought to said intermediate pressure, cocurrent expansion gas from another adsorber is introduced only to said second adsorber section until the pressure of said second adsorber section is substantially equal to the intermediate pressure of said first adsorber section and thereafter connecting said first and second adsorber sections and further pressurizing said first and second adsorber sections jointly with cocurrent expansion gas from another adsorber.

26. A process according to claim 25, wherein connecting of the two adsorber sections to be pressurized is controlled by a program control unit which receives signals from pressure monitoring means associated with each adsorber section.

27. In an apparatus for conducting a pressure swing adsorption process comprising at least three adsorbers, each of said adsorbers being connected by means of valves to a feed gas supply conduit, a discharge conduit for unadsorbed gas, a residual gas conduit, and at least one pressure equalization conduit, and a program control unit for controlling the operation of said valves, the improvement wherein each adsorber is subdivided into a first adsorber section and a second adsorber, said first and second adsorber sections being connected in series, and a regulating valve is arranged between said first and second adsorber sections, the position of said regulating valve being controlled by said program control unit in dependence on signals sent to said program control unit from a pressure measuring means associated with said second adsorber section.

28. An apparatus according to claim 27, wherein said first adsorber section is also provided with a pressure measuring means.

* * * * *